(No Model.)
B. M. HANNA.
EYEGLASSES OR SPECTACLES.
No. 306,919. Patented Oct. 21, 1884.
Fig. 1.
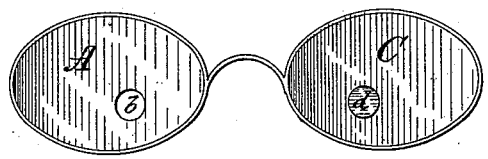
Fig. 2. Fig. 3.
 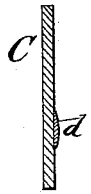
Attest:—
T. J. Patterson
Thomas O'Connor
Benjamin M. Hanna.
Inventor
Connolly Bros & McTighe
Attorneys.

UNITED STATES PATENT OFFICE.

BENJAMIN M. HANNA, OF PITTSBURG, PENNSYLVANIA.

EYEGLASSES OR SPECTACLES.

SPECIFICATION forming part of Letters Patent No. 306,919, dated October 21, 1884.

Application filed October 31, 1883. (No model.)

*To all whom it may concern:*

Be it known that I, BENJAMIN M. HANNA, of Pittsburg, in the county of Allegheny and State of Pennsylvania, have invented certain new and useful Improvements in Eyeglasses or Spectacles; and I do hereby declare that the following is a full, clear, and exact description of the invention, which will enable others skilled in the art to which it appertains to make and use the same, reference being had to the accompanying drawings, which form a part of this specification, in which—

Figure 1 is a front elevation of a pair of glasses, showing the two forms of my invention. Figs. 2 and 3 are sections of the glasses or lenses.

In a pending application I have described and claimed an improvement in eyeglasses or spectacles involving the use of a lens and a small supplemental lens wholly within the edges of the principal lens, and adapted to the convergence of the pupils of the eye in reading or writing, the two being of different focal lengths to adapt a single pair of spectacles to the double function of long and short distance vision. In many cases, however, the wearer needs only one pair of lenses—for example, he may require the lenses for distant objects, and yet can read easily at short distance—as in perusing a book or writing—without lenses at all. Or, again, the eyes may be weak and require tinted glasses which are not lenses, for ordinary use, and for reading or writing a lens may be desirable. For such and similar objects the present invention is intended, so that but one pair of glasses is required to be worn.

The invention consists in the devices hereinafter described and claimed.

The drawings illustrate two modifications of the invention. In Fig. 1 both forms are shown.

A is a lens adapted to long-distance vision, and at a point corresponding to the position of the pupil of the eye in reading or writing the lens is formed with an opening, $b$, which may be left as a simple aperture, or may be filled with a piece of plain glass having no lenticular character. A pair of such glasses, A $b$, may be worn constantly, and yet the eyes of the wearer can get the benefit of the lenses A, and, without removing them or uncomfortably moving the head, can look through $b\ b$ for reading or writing. In like manner the plain non-lenticular glasses C (tinted or not) may be used, and for reading or writing the lenses $d$ will be found in a convenient position for the purpose.

Obviously the lens $d$ may be set in various ways. It may be cemented on or into the glass C, or it may be ground in the glass C, or it may be otherwise attached. In all cases the portions used for near objects lie wholly within the edges of the main lenses, and in such position that the natural convergence of the pupils in looking at near objects—as in reading—will bring the lines of sight directly through such portions, so that while reading the simple act of fixing the eyes on a distant object in any other direction takes such said portions out of the line of vision.

I claim as my invention—

1. An eyeglass having in each glass one portion lenticular and the other portion non-lenticular, one of said portions being located wholly within the edges of the other and adapted to the convergence of the pupils of the eye in looking at near objects, substantially as described.

2. An eyeglass having the main portion non-lenticular and tinted and a small portion thereof lenticular, and located wholly within the edges of the main portion, substantially as described.

In testimony that I claim the foregoing as my own I have hereto affixed my signature in presence of two witnesses.

BENJAMIN M. HANNA.

Witnesses:
J. R. REED,
T. J. PATTERSON.